April 12, 1960 P. S. CRANDALL 2,932,271
FLOATING DRY DOCKS
Filed May 2, 1958 2 Sheets-Sheet 1
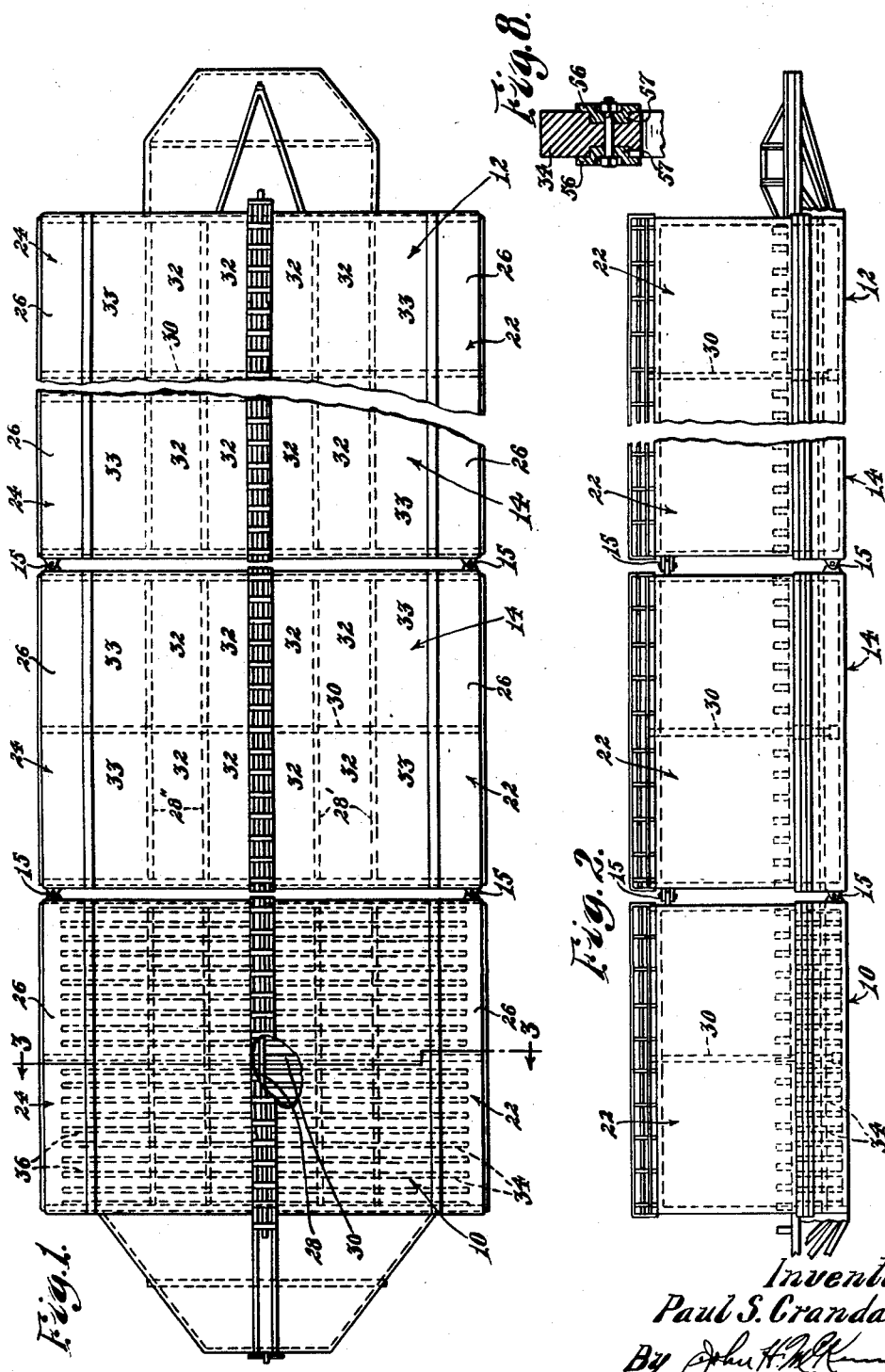
Inventor
Paul S. Crandall
By
Attorney.

April 12, 1960 — P. S. CRANDALL — 2,932,271
FLOATING DRY DOCKS
Filed May 2, 1958 — 2 Sheets-Sheet 2
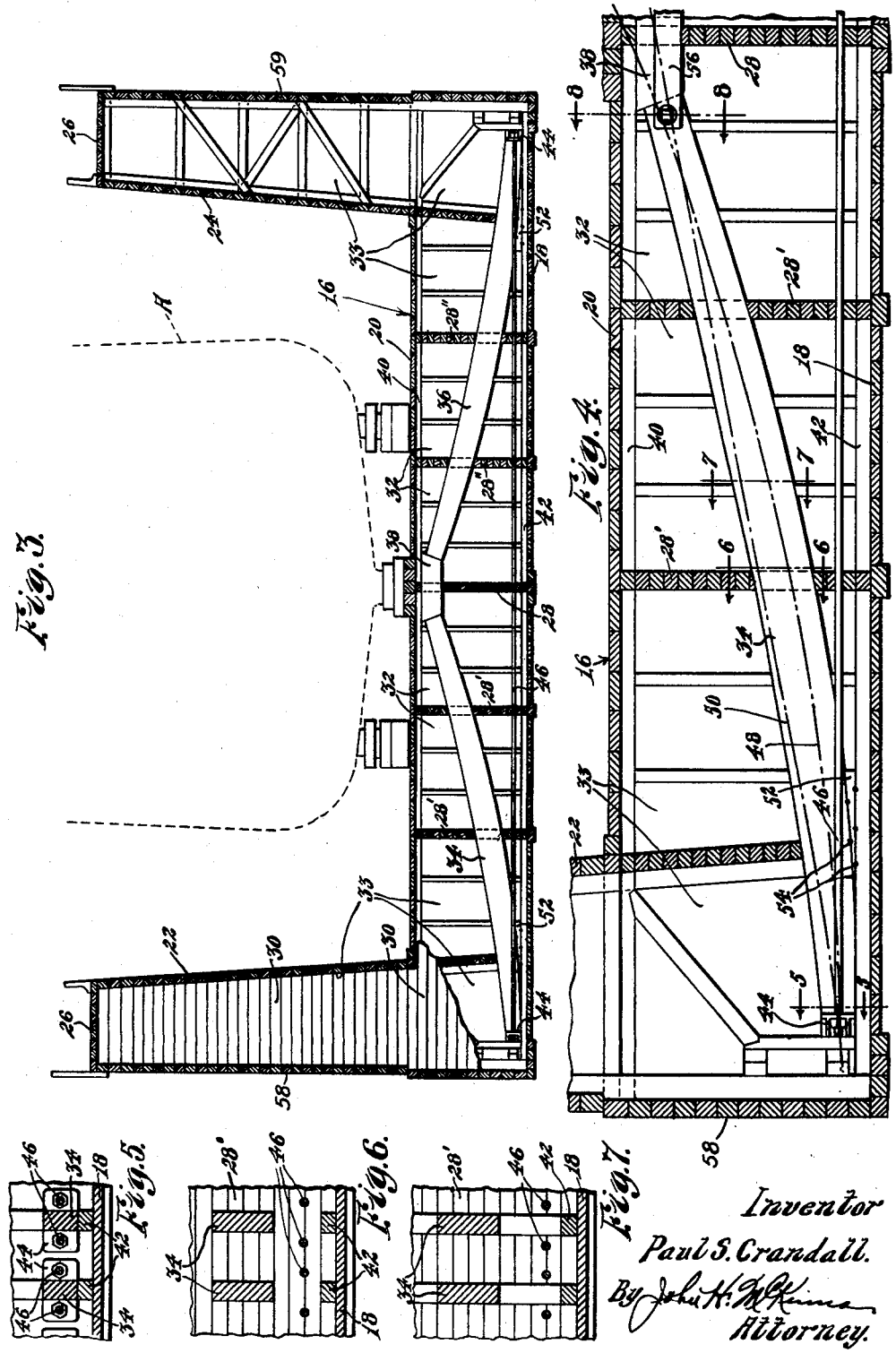
Inventor
Paul S. Crandall.
By John H. W. Keims
Attorney.

United States Patent Office 2,932,271
Patented Apr. 12, 1960

2,932,271

FLOATING DRY DOCKS

Paul S. Crandall, Concord, Mass., assignor to Crandall Dry Dock Engineers, Inc., Cambridge, Mass., a corporation of Massachusetts Application May 2, 1958, Serial No. 732,688

7 Claims. (Cl. 114—46)

This invention relates to improvements in floating dry docks and more particularly to floating dry docks of the general variety whose bottom sections are of wood construction. Such dry docks customarily comprise a plurality or series of generally similar units or sections which may be detachably connected together to form a dry dock having a desired and predetermined length and lifting capacity. Each unit may have a bottom hollow section and hollow wing sections rising vertically from the bottom section at each side thereof between which and over the bottom section a boat or hull to be dry docked may be floated when the dry dock is submerged. Ordinarily, the bottom section of each dry dock unit section is divided centrally and longitudinally by an interior central bulkhead which may extend from end to end longitudinally of the bottom section, and transverse bulkheads extend from the longitudinal bulkhead to the sides of and into the wings of the dry dock to provide a longitudinally aligned series of water tight compartments along each side of the central bulkhead. Each compartment may be provided with a flood gate opening and valve therefor, and each customarily is equipped with means for pumping water from the compartments when the dry dock is to be elevated. The volume of water in the respective compartments of a unit may be varied to adjust the buoyancy of the dock to the weight of the portions of the boat or hull which is supported above the respective compartments.

The invention is herein described in connection with a sectional dry dock, but it should be understood that the invention is not limited to sectional dry docks but is applicable to floating dry docks generally, sectional or not, which have their bottom portions of wood construction.

Although floating dry docks are frequently made with unit bottom sections constructed of steel, the wood construction is more buoyant.

The decks of the hollow wooden sections of dry dock units of the disclosed general variety must be supported by transverse structural supports at predetermined spaced locations along a dry dock unit and, heretofore, each of the transverse structural supports has consisted of a relatively complicated system of trusses with an associated series of vertical panels for transmitting horizontal components of stress into the bottom chord member and/or the top chord member. Each transverse trussing structure has involved a large number of expensive connections and joints and expensively long truss elements, such as from 26 feet to 30 feet in length. As an example of a simple and relatively schematic showing of a conventional trussing structure for wooden bottom sections of dry docks, reference is made to Patent No. 2,379,685, of July 3, 1945 (Fig. 3), which omits the connecting and jointing means which require considerable skill and much time to install.

It is among the objects of the present invention to provide an improved transversely disposed deck supporting and stress transmitting structure for wooden bottom sections of floating dry docks which greatly reduces the number of parts and the number of connections and joints as compared with prior conventional bottom section structures.

Another object of the invention is to provide at each location of the prior multiple element transverse trussing structure, two oppositely disposed large diagonal members, each extending from the longitudinal center region of the unit to the bottom chord member of the unit below one of the side wings thereof, and it is a feature of the invention that each of the said large diagonal members can be of laminated wood construction, of steel, or of suitably reinforced concrete.

Yet another object of the invention is to provide, in a floating dry dock unit bottom section, spaced pairs of relatively large oppositely disposed diagonal transverse members having their upper inner ends joined together by a chock block at the longitudinal center region of the unit and having their outer lower ends engaging a bottom chord member, with one or more long rods extending between the outer ends of the members of each said pair and cooperating with the said bottom chord member for maintaining the crown of the deck under load conditions.

A further object of the invention is to provide, in a floating dry dock bottom section, spaced pairs of inverted half-arch transverse members of which the individuals of each pair are joined together at their inner ends by a chock block having locking means associated therewith preventing relative slip of the block and said members, and key means locking the outer ends of said members against slip relative to the adjacent bottom chord member.

It is moreover my purpose and object generally to improve the structure and general efficiency of floating dry docks and more especially the separable units or sections thereof which have hollow bottom sections of wood construction.

In the accompanying drawings:

Fig. 1 is a top plan view, somewhat diagrammatic, of a floating dry dock embodying features of the invention;

Fig. 2 is a side elevation thereof;

Fig. 3 is a cross-sectional view in section on line 3—3 of Fig. 1, on a larger scale, showing one pair of the diagonal members which, according to the invention, replace the conventional multiple-element truss structures at each of a multiplicity of spaced locations along each floating dry dock unit or section;

Fig. 4 is a view generally similar to Fig. 3 but showing only one of the diagonal members on a still larger scale;

Fig. 5 is a detail cross-sectional view on line 5—5 of Fig. 4;

Fig. 6 is a detail cross-sectional view on line 6—6 of Fig. 4;

Fig. 7 is a detail cross-sectional view on line 7—7 of Fig. 4; and

Fig. 8 is a detail cross-sectional view on line 8—8 of Fig. 4.

Referring to the drawings, and more particularly to Figs. 1 and 2, the illustrated floating dry dock has end units or sections 10, 12, and a series of generally similar intermediate units or sections 14, all of the units or sections being detachably connected together at 15 in a well known manner to provide a floating dry dock having a predetermined length and predetermined lifting capacity. Each unit or section is generally complete in and of itself and comprises a hollow buoyant section 16 (Figs. 3 and 4) having a bottom wall 18 and top wall or deck 20 upon which the docked boat or hull A rests. Each unit or section also has, at the longitudinal sides thereof, hollow upstanding wings 22, 24, the horizontal tops 26 of which provide working platforms or decks at opposite sides of the docked boat or hull A and the side walls 58 and 59 of which form an external closure or top side for the unit.

Each of the units or sections 10, 12 and 14 has a centrally disposed longitudinal bulkhead 28 dividing its interior, and may have two or more additional longitudinal bulkheads 28′, 28″, and each of the units or sections has one or more transverse bulkheads 30. As herein disclosed, each unit or section has five longitudinal bulkheads 28, 28′, 28″ and one transverse bulkhead 30, dividing the interior of each bottom section into twelve water-tight compartments or chambers 32, and 33, of which each outer compartment or chamber 33 extends upwardly within the adjacent wing 22 or 24.

The control means for filling and emptying the compartments 32, 33 may be any of the well known and conventional means for this purpose and are not herein shown.

According to the invention, the multiple-element trussing structure heretofore required at each of a multiplicity of transverse locations along a floating dry dock unit or section, is replaced at each of the said transverse locations by a pair of relatively long and large members 34, 36 (Fig. 3) oppositely disposed at opposite sides of the longitudinal bulkhead 28 of the unit or section. Each member 34, 36 constitutes an inverted one half of an arch extending diagonally from a chock block 38 which is in engagement with a top chord member 40 at the region of the longitudinal center line of the unit or section. The upper inner ends of the members 34, 36 are suitably secured to the chock block 38 and each extends diagonally downward to a bottom chord member 42, and the lower outer end of each member 34, 36 is secured, each to its own cap plate 44, to which the ends of a pair of long rods 46 are secured, the said rods extending, at opposite sides of the members 34, 36 from the cap plate 44 of member 34 to the cap plate 44 of member 36. The rods coact with members 34, 36 and the chord members in maintaining the deck 20, under load conditions. In effect, the rods 46 and the associated bottom chord members 42 serve as a composite bottom chord, and the tensioning of the rods may be adjusted as may be desired by any suitable means at one or both ends of each rod. Ordinarily, the rods will be only reasonably taut until a load on the dry dock subjects them to substantial tensile stress.

The pairs of inverted half-arch members 34, 36 ordinarily will be spaced three or four feet apart, for example, throughout the length of each docking unit or section although their spacing in any particular floating dry dock may be varied to suit particular requirements. In the left hand end unit or section 10 of Fig. 1, twenty of the pairs of members 34, 36 are indicated, by dotted lines, ten on each side of the transverse bulkhead 30.

The outer ends of the members 34, 36 may be secured to the bottom chord members 42 by any suitable fastening means, and a generally wedge-shaped filler member 52 preferably is provided at each juncture of a member 34, or 36 with a bottom chord member 42. The meeting sufraces of the members 34, 36, 52 and 42 preferably are oppositely grooved for reception of key-rods 54 which effectively lock the said members against relative movement in directions transversely of the dock.

The inner ends of the members 34, 36 may be secured to the chock blocks 38 and top chord members 40 by any suitable fastening means, and I prefer to lock the inner ends of each pair of members 34, 36 against being spread apart under reverse or negative bending stresses. This locking means may be any of various devices for strongly tieing together the adjacent inner ends of each pair of members 34, 36, such as rigid steel plates 56 on each side of a chock block 38, as represented in Figs. 4 and 8, with means 57 on the opposite end portions of the plates set into the members 34, 36 (Fig. 8), and with bolts extending through the plates and members 34, 36, securing the assemblage.

Spaced vertical struts or posts are provided between the members 34, 36 and the respective top and bottom chord members 40, 42.

Assuming that the illustrated floating dry dock is a six unit or section dock having 12,000 long tons capacity, the width of each unit or section may approximate 112 feet. Hence, the length of the members 34, 36 may be of the order of 50 feet or more with a uniform width of the order of 1 foot. The depth of each member varies at different locations along the member. For example, in Fig. 4, the thickness at the lower outer end of member 34 may be 20 inches, gradually increasing to 36 inches at its region of maximum thickness, and then gradually diminishing in thickness to 24 inches, for example, at its upper inner end which is connected to chock block 38.

In Fig. 4, the dot and dash line 48 represents the full load stress line, and the dot and dash line 50 represents the partial load stress line. These load stress lines will vary under different conditions but always must be located within the boundaries of the members 34, 36.

It is a feature of the invention that the members 34, 36 advantageously may be of laminated wood construction, although they might be made of steel or reinforced concrete. In any case, they avoid the need for the relatively long wood elements of the prior multi-element truss structures which are expensive as well as difficult to obtain, of proper quality, in the required lengths and sizes. Laminated members 34, 36 may be fabricated from relatively short pieces, and the disclosed structure, employing the members 34, 36, greatly reduces the number of critical joints which have to be made, as compared with the prior multi-element truss structures.

The herein disclosed structure has the further important advantage that it permits an unloaded compartment to exert buoyancy, through the wing structure, on an adjacent loaded compartment. For example, a short heavy ship or hull may be lifted even though its longitudinal weight per foot may exceed slightly, at zero free board, the buoyancy of compartments underneath the ship or hull.

Various changes may be made in details of the structure as herein disclosed, within the scope of the appended claims, and it is intended that the patent shall cover, by suitable expression in the appended claims, whatever features of patentable novelty exist in the invention disclosed.

I claim as my invention:

1. In a floating dry dock unit having a hollow bottom section with a deck mounted on interior transverse top chord members and a bottom secured to interior transverse bottom chord members, said bottom section being divided interiorly by a centrally disposed longitudinal bulkhead and divided interiorly by at least one transverse bulkhead, that improvement comprising a series of pairs of inverted half-arch members arranged within said bottom section and disposed in spaced relation transversely thereof, the individuals of each said pair being in alignment at opposite sides of said centrally disposed longitudinal bulkhead with their inner ends secured together and to a said top chord member at the location of said longitudinal bulkhead, and with their outer ends disposed adjacent to the opposite side walls of the unit in engagement with a said bottom chord member, and a rod extending between and connected to the outer ends of the individuals of each said pair of half-arch members for resisting tensile stresses applied thereto through the said inverted half-arch members.

2. In a floating dry dock unit, the improvement as defined in claim 1 wherein the inner ends of the individuals of each said pair of half-arch members are connected to a chock block which in turn is connected to a said top chord member at the location of said centrally disposed longitudinal bulkhead.

3. In a floating dry dock unit, the improvement as defined in claim 1 wherein each said half-arch member has uniform width in direction longitudinally of the unit and has gradually diminishing thickness from a region of maximum thickness generally centrally between its ends to each of its ends.

4. In a floating dry dock unit having a hollow bottom section with a deck mounted on interior transverse top chord members and a bottom secured to interior transverse bottom chord members, said bottom section being divided interiorly by a centrally disposed longitudinal bulkhead and divided interiorly by at least one transverse bulkhead, that improvement comprising a series of pairs of inverted half-arch members arranged within said bottom section and disposed in spaced relation transversely thereof, the individuals of each said pair being in alignment at opposite sides of said centrally disposed longitudinal bulkhead with their inner ends secured together and to a said top chord member at the location of said longitudinal bulkhead, and with their outer ends disposed adjacent to the opposite side walls of the unit in engagement with a said bottom chord member, a cap fixture on the outer ends of the individuals of each said pair of half-arch members, and a pair of pre-tensioned rods at opposite sides of each said pair of members and extending between and connected to the said cap fixtures on the individuals of each said pair of half-arch members.

5. In a hollow bottom section structure for a floating dry dock unit having a deck mounted on transverse top chord members, and a bottom secured to interior transverse bottom chord members, means for maintaining the said deck in load supporting condition comprising a multiplicity of pairs of inverted half-arch members disposed in spaced transverse parallelism within said bottom section, the individuals of each said pair of members being in alignment at opposite upper sides of the longitudinal center line of the unit and each extending diagonally from the region of said center line outwardly and downwardly to a location adjacent to an outer side wall of the unit, the inner ends of the members of each said pair being secured together and to a said top chord member at said region of the longitudinal center line of the unit, and the outer ends of the members of each said pair being connected to a said bottom chord member, and at least one tensile rod element connecting the outer ends of the individual members of each said pair for resisting tensile stresses applied thereto through the said inverted half-arch members for maintaining the deck of the unit under full and partial load conditions.

6. In a hollow bottom section structure for a floating dry dock, means for maintaining the said deck in load supporting condition, as defined in claim 5, wherein the means for effecting the said securement of the inner ends of said members comprises a chock block secured to a said top chord member and to the inner ends of the individuals of a said pair of inverted half-arch members, and a tensile tie locking the inner end portions of the individuals of each said pair of members for preventing spreading apart of said members when said members are subjected to negative bending stresses.

7. In a hollow bottom section for a floating dry dock, means for maintaining the said deck in load supporting condition, as defined in claim 5, wherein the said connection of the outer ends of the individuals of each said pair of inverted half-arch members to a said bottom chord member includes a filler element between outer end portions of said half-arch members and a said bottom chord member, the adjacent surfaces of said filler element and members being oppositely transversely grooved in parallelism, and keys seated in said grooves for locking said filler element, half-arch members and bottom chord members against relative movement in directions transversely of said dry dock bottom section.

References Cited in the file of this patent
UNITED STATES PATENTS

| | | |
|---|---|---|
| 647,269 | Lang | Apr. 10, 1900 |
| 656,582 | Lang | Aug. 21, 1900 |
| 874,849 | Karr et al. | Dec. 24, 1907 |
| 920,283 | Donnelly | May 4, 1909 |
| 2,291,076 | Harris | July 28, 1942 |